(12) United States Patent
Wong et al.

(10) Patent No.: US 10,633,051 B2
(45) Date of Patent: Apr. 28, 2020

(54) ADJUSTABLE SPACER STRUCTURE OF BICYCLE

(71) Applicant: GIANT MANUFACTURING CO., LTD., Taichung (TW)

(72) Inventors: Hsi Wong, Taichung (TW); Hua-Chun Huang, Taoyuan (TW); Bo-Hao Huang, Taichung (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 293 days.

(21) Appl. No.: 15/889,221

(22) Filed: Feb. 6, 2018

(65) Prior Publication Data

US 2018/0222546 A1 Aug. 9, 2018

Related U.S. Application Data

(60) Provisional application No. 62/454,916, filed on Feb. 6, 2017.

(30) Foreign Application Priority Data

Jan. 5, 2018 (TW) .............................. 107100534 A

(51) Int. Cl.
*B62K 21/22* (2006.01)
*B62J 99/00* (2020.01)
*B62K 21/20* (2006.01)
*B62K 21/18* (2006.01)

(52) U.S. Cl.
CPC ....... *B62K 21/22* (2013.01); *B62J 2099/0046* (2013.01); *B62K 21/18* (2013.01); *B62K 21/20* (2013.01)

(58) Field of Classification Search
CPC ........ B62K 21/22; B62K 21/20; B62K 21/18; B62J 2099/0046
See application file for complete search history.

(56) References Cited

U.S. PATENT DOCUMENTS

| 6,167,780 | B1 * | 1/2001 | Chen ...................... | B62K 21/06 74/551.1 |
| 7,069,812 | B1 * | 7/2006 | Rettig .................... | B62K 21/16 280/279 |
| 8,087,685 | B2 * | 1/2012 | Weidner ................. | B62K 21/06 280/279 |
| D687,742 | S * | 8/2013 | Lin .............................. | D12/114 |
| 2003/0110880 | A1 * | 6/2003 | Tison ..................... | B62K 21/06 74/551.8 |

* cited by examiner

*Primary Examiner* — Kevin Hurley
*Assistant Examiner* — Marlon A Arce
(74) *Attorney, Agent, or Firm* — CKC & Partners Co., LLC

(57) ABSTRACT

An adjustable spacer structure of a bicycle is used for adjusting a height of a stem disposed on a steering tube. The adjustable spacer structure includes a first spacer and a second spacer. The first spacer includes a body and a positioning portion. The body has a ring shape and a first opening, and the steering tube is movably disposed through the first opening. The positioning portion is disposed on the body. The second spacer has a ring shape and a combining portion. The combining portion is detachably connected to the positioning portion, and there is a second opening formed between the first spacer and the second spacer. The stem is abutted against the first spacer.

22 Claims, 15 Drawing Sheets

ADJUSTABLE SPACER STRUCTURE OF BICYCLE

RELATED APPLICATIONS

This application claims priority to U.S. Provisional Application Ser. No. 62/454,916 filed Feb. 6, 2017, and Taiwan Application Serial Number 107100534, filed Jan. 5, 2018, the disclosures of which are incorporated herein by reference in their entireties.

BACKGROUND

Technical Field

The present disclosure relates to an adjustable spacer structure of a bicycle. More particularly, the present disclosure relates to an adjustable spacer structure of a bicycle which is easily assembled and disassembled and satisfies a fully integrated requirement.

Description of Related Art

Conventional spacer structures of bicycles generally belong to a closed type spacer. If a user wants to adjust a height of a spacer structure or replace a cable inside the spacer structure, a stem needs to be disassembled firstly and then the user may change the number of the spacer structures to adjust the height. However, the conventional closed type spacer conflicts with the design methodology of a hidden cable structure of bicycles and does not meet the current requirements.

Another conventional spacer structure of bicycles has a circular shape and is configured to utilize spacers having a stepped shape with different heights for adjusting the position of the stem. This structure increases user's convenience. However, the strength of the conventional spacer structure is insufficient, and the adjustable range of the conventional spacer structure is limited, so that a fully integrated structure cannot be achieved. Therefore, an adjustable spacer structure of the bicycle which is easily assembled and disassembled and satisfies a fully integrated requirement is commercially desirable.

SUMMARY

According to one aspect of the present disclosure, an adjustable spacer structure of a bicycle is used for adjusting a height of a stem disposed on a steering tube. The adjustable spacer structure includes at least one first spacer and a second spacer. The first spacer includes a body and a positioning portion. The body has a ring shape and a first opening, and the steering tube is movably disposed through the first opening. The positioning portion is disposed on the body. The second spacer has a ring shape and a combining portion. The combining portion is detachably connected to the positioning portion, and there is a second opening formed between the first spacer and the second spacer. The stem is abutted against the first spacer.

According to another aspect of the present disclosure, an adjustable spacer structure of a bicycle is used for adjusting a height of a stem disposed on a steering tube. The adjustable spacer structure includes at least one first spacer and a spacer assembly. The first spacer includes a body and a positioning portion. The body has a ring shape and a first opening, and the steering tube is movably disposed through the first opening. The positioning portion is disposed on the body. The spacer assembly includes a plurality of second spacers. Each of the second spacers has a ring shape and a combining portion. The combining portion is detachably connected to the positioning portion. The second spacers are stacked onto each other, and there is a second opening formed between the first spacer and the second spacers. The stem is abutted against the first spacer.

According to further another aspect of the present disclosure, an adjustable spacer structure of a bicycle is used for adjusting a height of a stem disposed on a steering tube. The adjustable spacer structure includes a first spacer and at least one second spacer. The first spacer includes a body and a positioning portion. The body has a ring shape, a first opening and a second opening, and the steering tube is movably disposed through the first opening. The positioning portion is disposed on the body. The second spacer is stacked on the body. The second spacer has a ring shape and a combining portion. The combining portion has a gap and is detachably connected to the positioning portion via the gap. The steering tube is configured to pass through the gap, and there is a third opening formed between the second spacer and the positioning portion of the first spacer. The stem is abutted against the second spacer and stacked over the first spacer.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
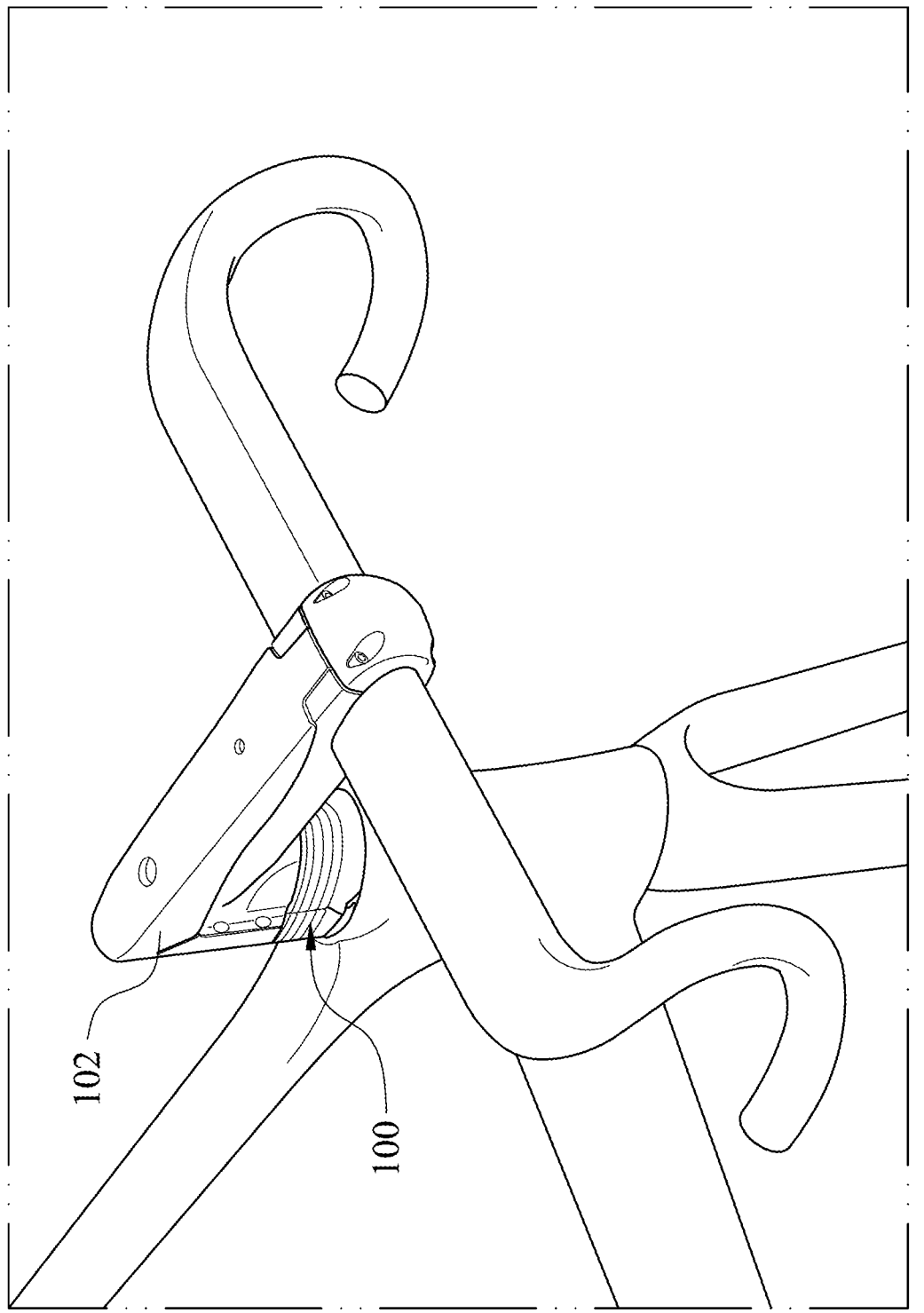
FIG. 1 shows a schematic view of an adjustable spacer structure of a bicycle according to a first embodiment of the present disclosure.
Figure 2:
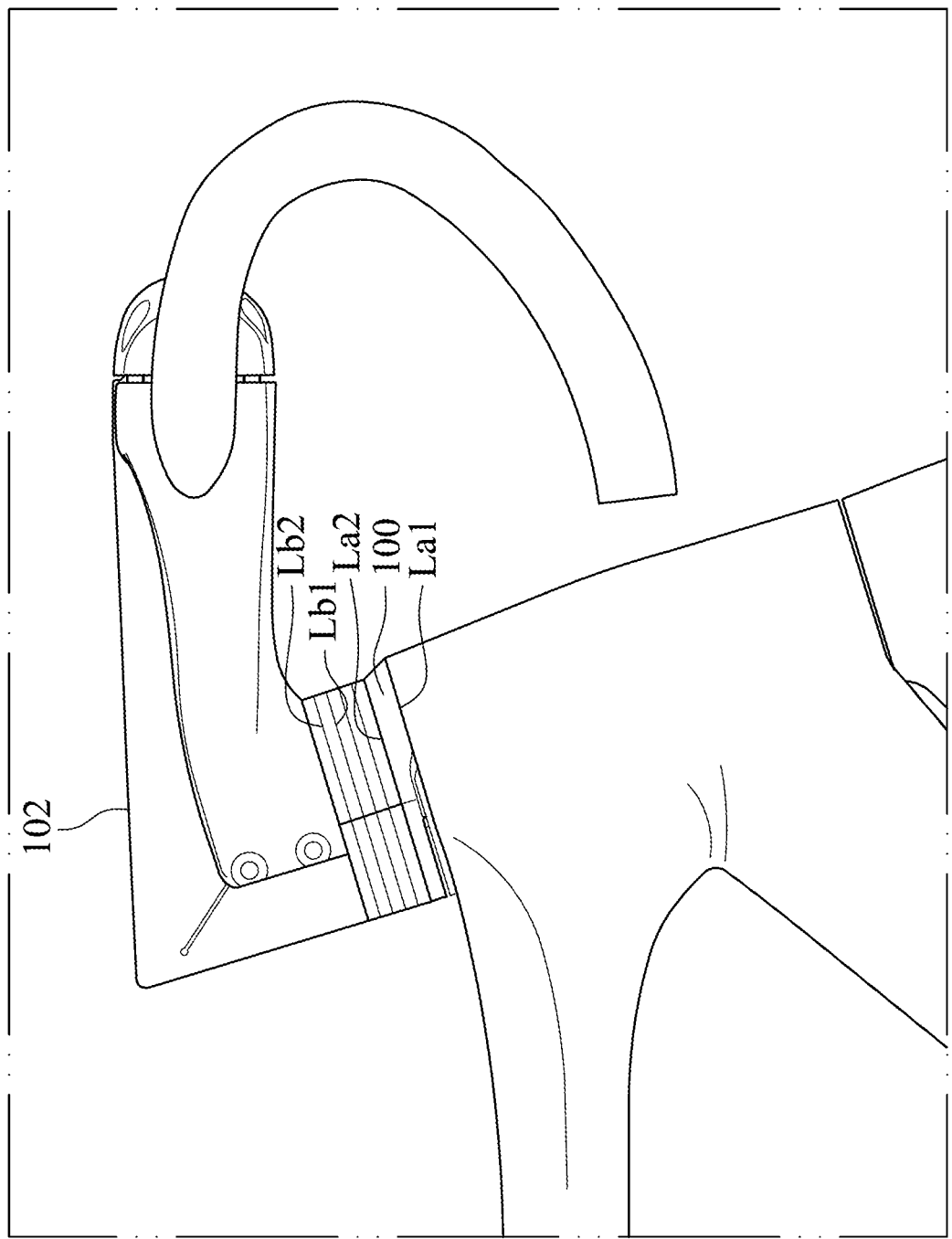
FIG. 2 shows a schematic side view of the adjustable spacer structure of the bicycle of FIG. 1.
Figure 3:
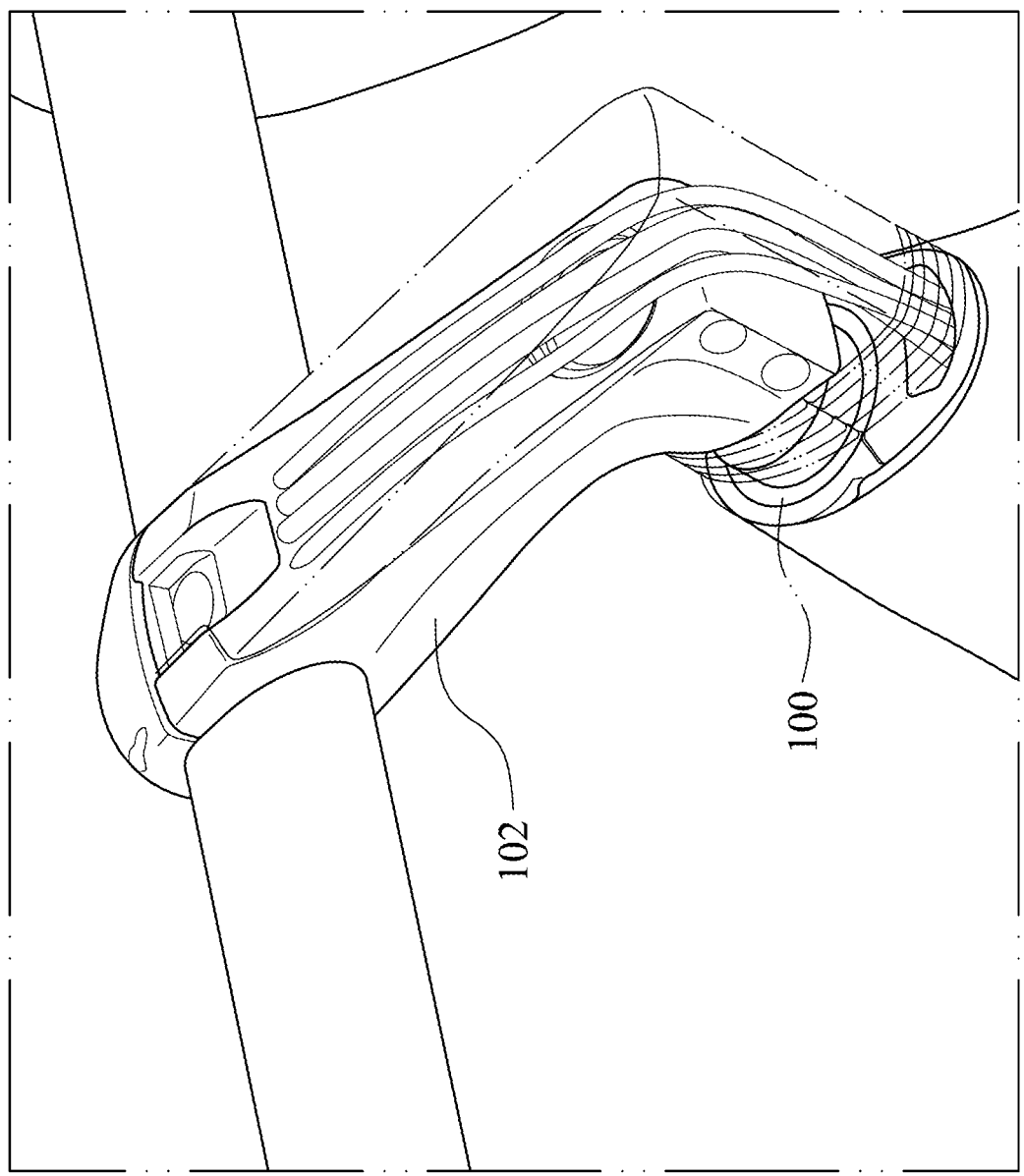
FIG. 3 shows another schematic view of the adjustable spacer structure of the bicycle of FIG. 1.
Figure 4:
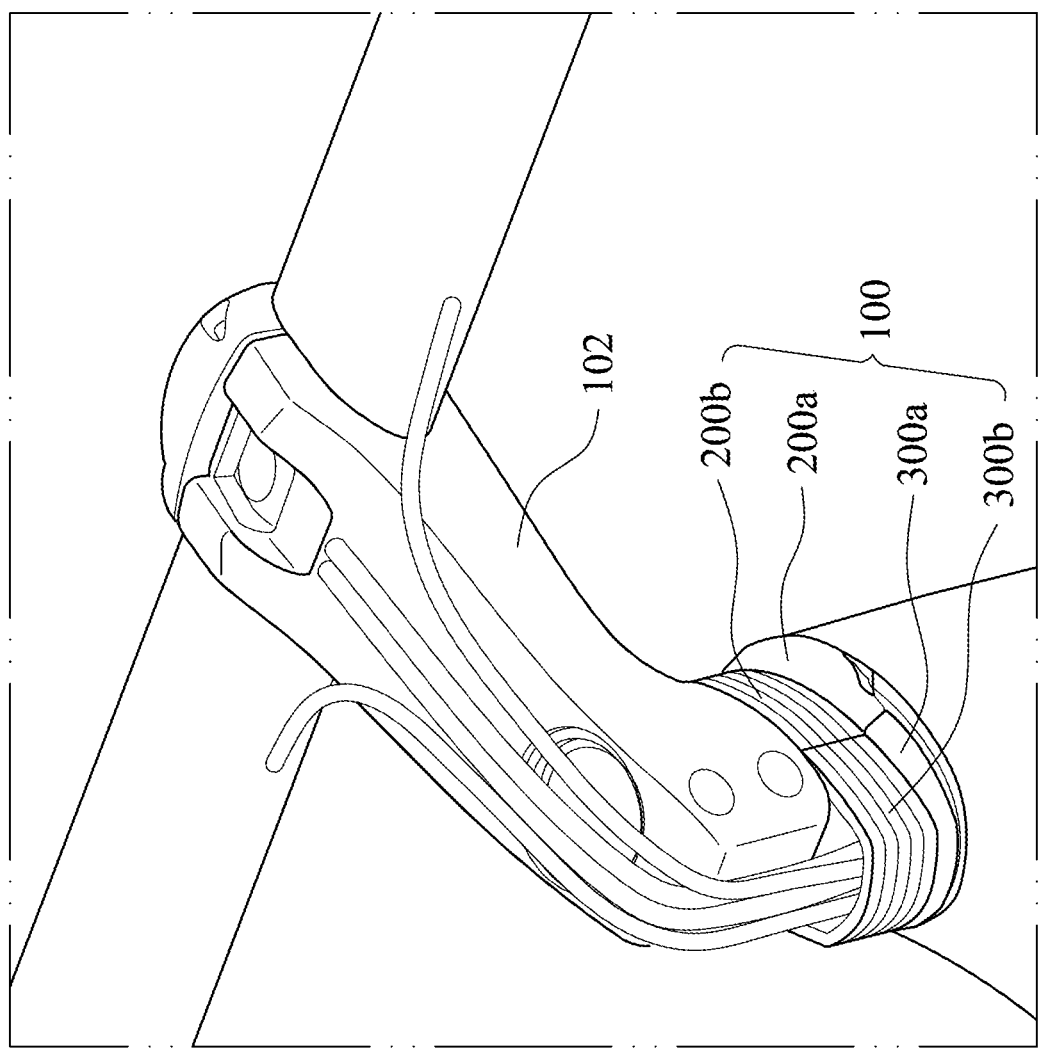
FIG. 4 shows further another schematic view of the adjustable spacer structure of the bicycle of FIG. 1.
Figure 5:
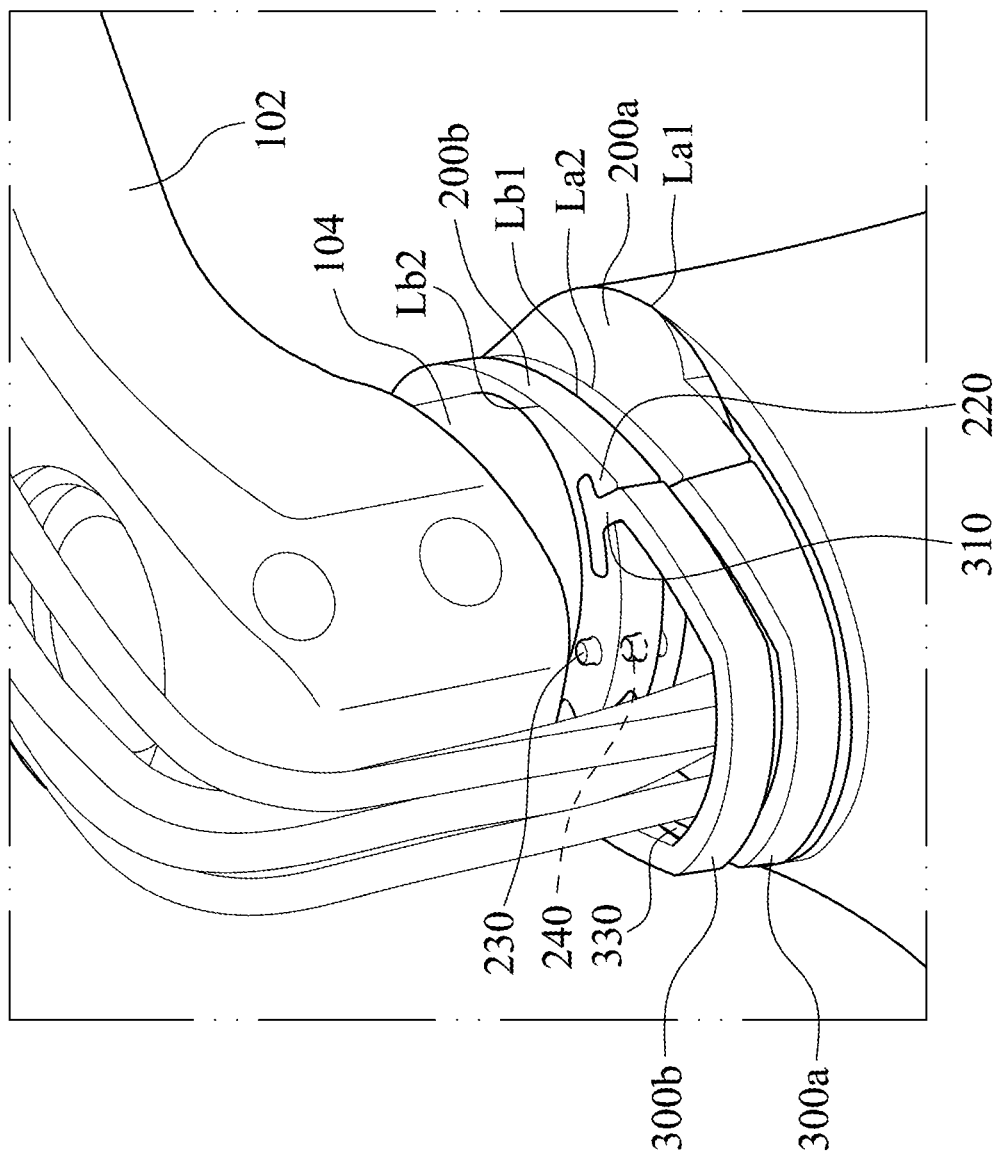
FIG. 5 shows a partially enlarged schematic view of the adjustable spacer structure of the bicycle of FIG. 4.
Figure 6B:
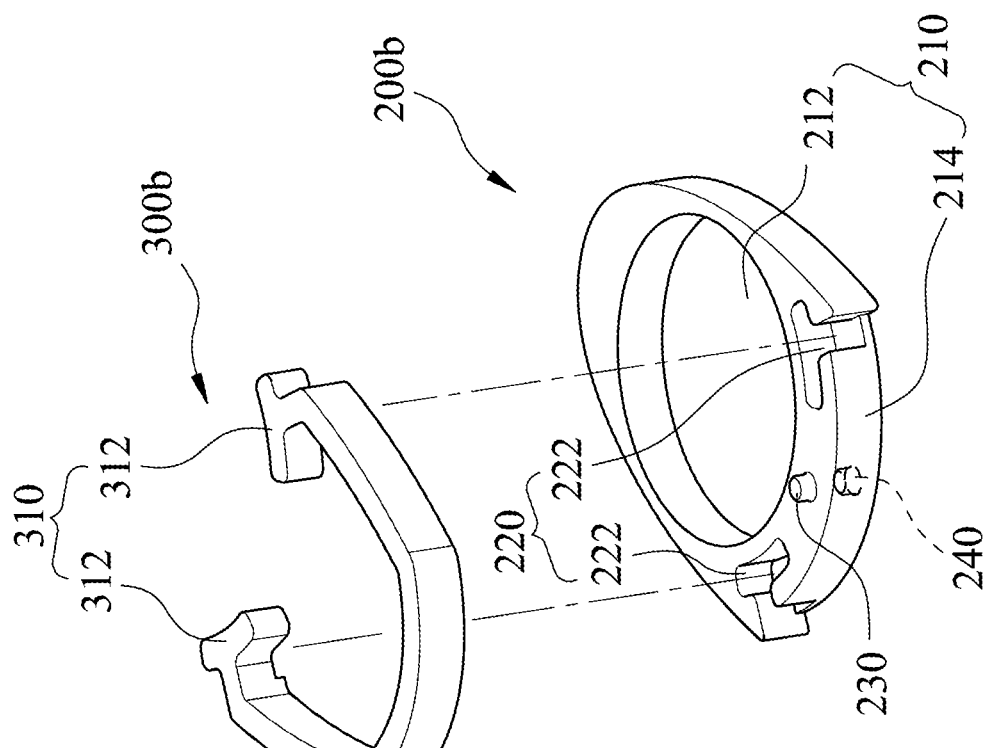
FIG. 6B shows an exploded view of the adjustable spacer structure of FIG. 6A.
Figure 6A:
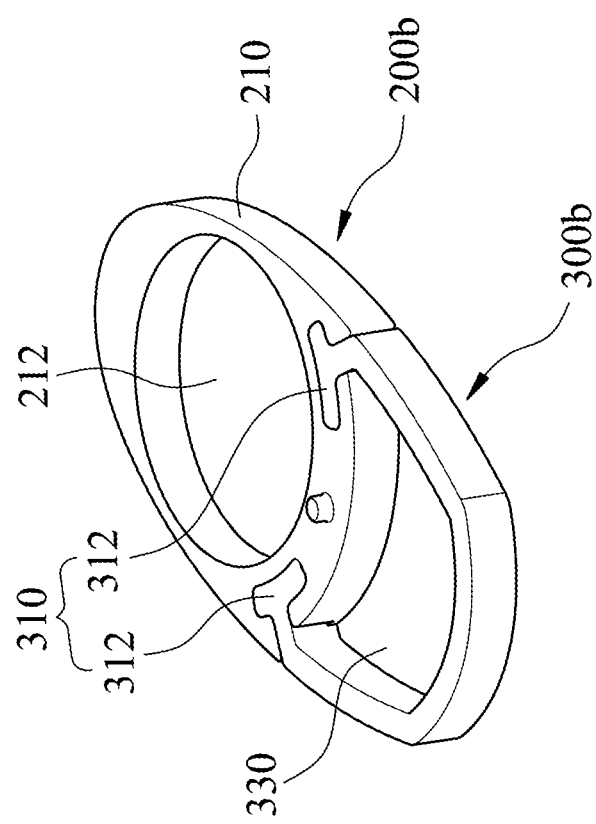
FIG. 6A shows a schematic view of the adjustable spacer structure of FIG. 5.

FIG. 1 shows a schematic view of an adjustable spacer structure 100 of a bicycle according to a first embodiment of the present disclosure; FIG. 2 shows a schematic side view of the adjustable spacer structure 100 of the bicycle of FIG. 1; FIG. 3 shows another schematic view of the adjustable spacer structure 100 of the bicycle of FIG. 1; FIG. 4 shows further another schematic view of the adjustable spacer structure 100 of the bicycle of FIG. 1; FIG. 5 shows a partially enlarged schematic view of the adjustable spacer structure 100 of the bicycle of FIG. 4; FIG. 6A shows a schematic view of the adjustable spacer structure 100 of FIG. 5; and FIG. 6B shows an exploded view of the adjustable spacer structure 100 of FIG. 6A. In FIGS. 1-4, the adjustable spacer structure 100 of the bicycle is used for adjusting a height of a stem 102 disposed on a steering tube 104. The adjustable spacer structure 100 includes one first spacer 200a, five first spacers 200b, one second spacer 300a and five second spacers 300b. In FIG. 5, the adjustable spacer structure 100 of the bicycle includes one first spacer 200a, one first spacer 200b, one second spacer 300a and one second spacer 300b.

The first spacer 200a is disposed below the first spacer 200b. The first spacer 200a includes a body 210, a positioning portion 220 and a latching portion 230. The body 210 has a closed ring shape. The body 210 includes a first opening 212 and an exposed surface 214. The steering tube 104 is movably disposed through the first opening 212. The positioning portion 220 is disposed on the body 210. The positioning portion 220 includes two concave grooves 222, and the exposed surface 214 is located between the two concave grooves 222. In addition, the first spacer 200a has a lower surface contour circumference La1 and an upper surface contour circumference La2. The lower surface contour circumference La1 is greater than the upper surface contour circumference La2. In other words, the first spacer 200a has a top surface and a bottom surface. An area of the bottom surface is larger than an area of the top surface, so that the first spacer 200a can be stably connected to a head tube of the bicycle. Moreover, the latching portion 230 is adjacent to the positioning portion 220 and disposed on the top surface of the body 210. The latching portion 230 is correspondingly engaged with the first spacer 200b which is stacked above the first spacer 200a.

The first spacer 200b has a top surface and a bottom surface, and the top surface of the first spacer 200b is abutted against the stem 102 (i.e., the stem 102 is abutted against the first spacer 200b). The first spacer 200b includes a body 210, a positioning portion 220, a latching portion 230 and a latching slot 240. The body 210 has a closed ring shape. The body 210 includes a first opening 212 and an exposed surface 214. The steering tube 104 is movably disposed through the first opening 212. The positioning portion 220 is disposed on the body 210. The positioning portion 220 includes two concave grooves 222, and the exposed surface 214 is located between the two concave grooves 222. Moreover, the first spacer 200a has a lower surface contour circumference Lb1 and an upper surface contour circumference Lb2. The lower surface contour circumference Lb1 is equal to the upper surface contour circumference Lb2. In other words, the shape of the top surface is the same as the shape of the bottom surface, so that a plurality of first spacers 200b may be alignedly stacked together. In addition, the latching portion 230 and the latching slot 240 are adjacent to the positioning portion 220. The latching portion 230 and the latching slot 240 are disposed on the top surface and the bottom surface of the body 210, respectively. The latching portion 230 may be correspondingly engaged with another first spacer 200b. The latching slot 240 of the first spacer 200b can be correspondingly engaged with the latching portion 230 of the first spacer 200a so as to stack the first spacer 200b on the first spacer 200a.

The second spacer 300a has a ring shape. The second spacer 300a includes a combining portion 310 and a surrounding portion 320. The combining portion 310 is detachably connected to the positioning portion 220, and there is a second opening 330 formed between the first spacer 200a and the second spacer 300a. In detail, the combining portion 310 is integrally connected to the surrounding portion 320. The combining portion 310 includes two convex portions 312. The two convex portions 312 are detachably connected to the two concave grooves 222 of the first spacer 200a, respectively. The shapes of the two convex portions 312 are corresponding to the shapes of the two concave grooves 222, respectively. In FIGS. 6A and 6B, the two convex portions 312 are symmetrically opposed to each other, and the two concave grooves 222 are symmetrically opposed to each other, too. Certainly, the asymmetry in the shape of the two convex portions 312 and the two concave grooves 222 may be used according to the requirements of the manufacturer. Additionally, the surrounding portion 320 is fixedly connected to the two convex portions 312, and the second opening 330 is formed by the surrounding portion 320 and the exposed surface 214. The second opening 330 can be passed through by a transmission cable or a brake cable, thereby limiting the transmission cable or the brake cable. The two convex portions 312 are integrally connected to the surrounding portion 320. Furthermore, there is a chink between the second spacer 300a the head tube of the bicycle. The second spacer 300a has a horseshoe shape or an arc shape. In FIGS. 4 and 5, the second spacer 300a has the horseshoe shape. A thickness of the surrounding portion 320 of the second spacer 300a is gradually decreased from one end adjacent to the combining portion 310 to another end far away from the combining portion 310. The structure of the second spacer 300b is similar to the structure of the second spacer 300a. The only difference is that the thickness of the surrounding portion 320 of the second spacer 300b is uniform. In addition, when the first spacer 200b and the second spacer 300b are fixedly stacked on the first spacer 200a and the second spacer 300a, respectively, the stem 102 may be abutted against the first spacer 200b and the second spacer 300b so as to position the first spacer 200a and the second spacer 300a. The second spacer 300b is tightly abutted against the stem 102 and the first spacer 200b. The second spacer 300a and the second spacer 300b are aligned with each other. The first spacer 200b is correspondingly connected to the top surface of the first spacer 200a. Therefore, the adjustable spacer structure 100 of the present disclosure can only release the stem 102 and disassemble the second spacers 300a, 300b when replacing the cable inside the adjustable spacer structure 100, and the stem 102 and the first spacers 200a, 200b are not separated from the steering tube 104 of the bicycle. The adjustable spacer structure 100 of the present disclosure may be easily assembled and disassembled and satisfy a fully integrated requirement.

Figure 7B:
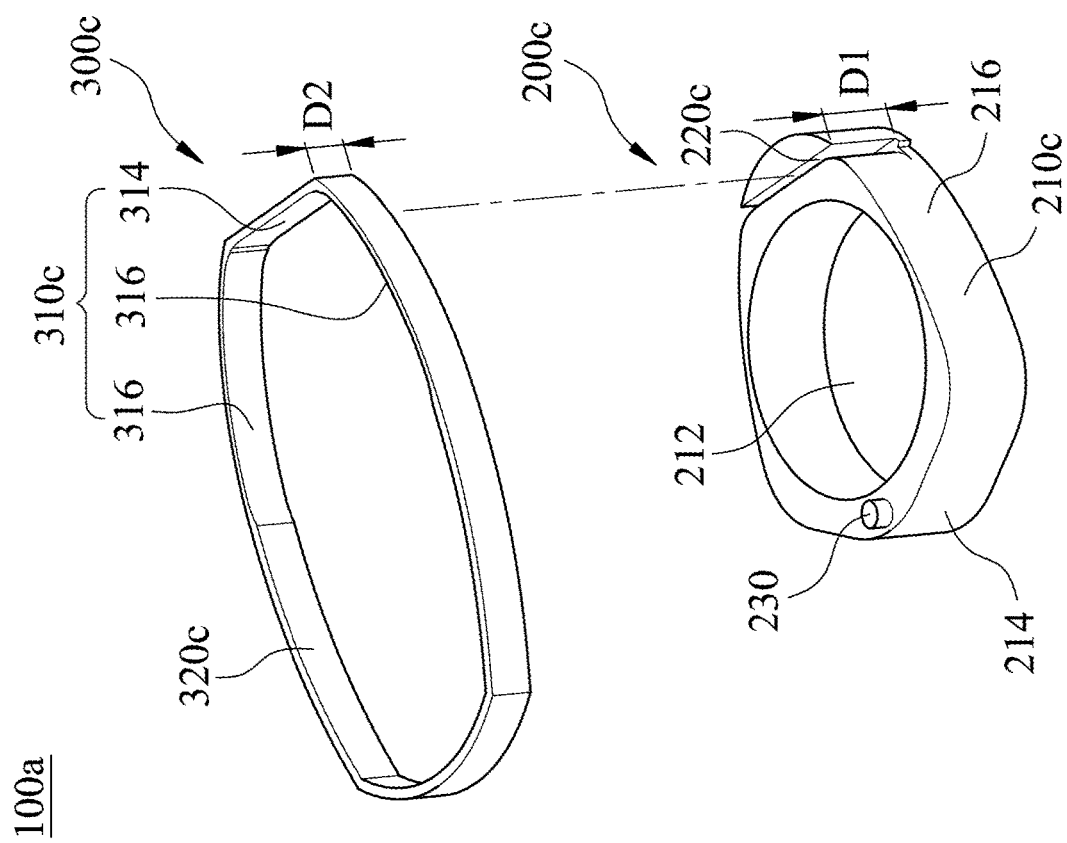
FIG. 7B shows an exploded view of the adjustable spacer structure of FIG. 7A.
Figure 7A:
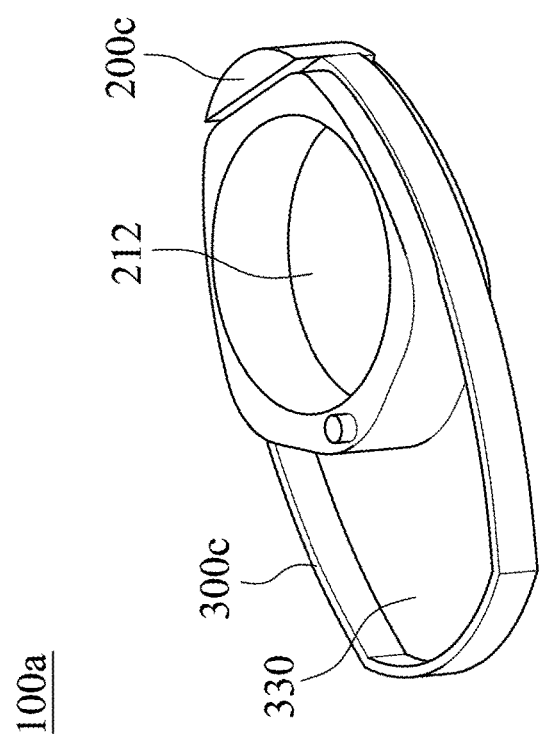
FIG. 7A shows a schematic view of an adjustable spacer structure according to a second embodiment of the present disclosure.

FIG. 7A shows a schematic view of an adjustable spacer structure 100a according to a second embodiment of the present disclosure; and FIG. 7B shows an exploded view of the adjustable spacer structure 100a of FIG. 7A. The adjustable spacer structure 100a includes a first spacer 200c and a second spacer 300c.

The first spacer 200c includes a body 210c, a positioning portion 220c and a latching portion 230. The body 210c has a closed ring shape. The body 210c includes a first opening 212, an exposed surface 214 and two outside surfaces 216. The steering tube 104 is movably disposed through the first opening 212. The positioning portion 220c is disposed on the body 210. The positioning portion 220c and the latching portion 230 are located at two ends of the body 210c, respectively. In other words, the positioning portion 220c and the latching portion 230 are located at two sides of the first opening 212. The positioning portion 220c has a groove shape and a recess depth D1. The exposed surface 214 is connected between the two outside surfaces 216. The latching portion 230 is disposed on the top surface of the body 210c. The latching portion 230 can be engaged with another first spacer (not shown) so as to stack another first spacer on the first spacer 200c.

The second spacer 300c has a ring shape. The second spacer 300a includes a combining portion 310c and a surrounding portion 320c. The combining portion 310c is detachably connected to the positioning portion 220c, and there is a second opening 330 formed between the first spacer 200c and the second spacer 300c. In detail, the combining portion 310c is integrally connected to the surrounding portion 320c. The combining portion 310c includes an engaging portion 314 and two abutting portions 316. The engaging portion 314 is correspondingly engaged with the positioning portion 220c. The two abutting portions 316 are connected to two ends of the engaging portion 314, respectively, and the two abutting portions 316 are connected to the two outside surfaces 216, respectively. Moreover, two ends of the surrounding portion 320c are connected to the two abutting portions 316, respectively. The second opening 330 is formed by an inner surface of the surrounding portion 320c and the exposed surface 214. The engaging portion 314 is integrally connected to the two abutting portions 316 and the surrounding portion 320c, and the engaging portion 314 has a gasket thickness D2. The gasket thickness D2 is less than or equal to the recess depth D1 of the positioning portion 220c. Additionally, the adjustable spacer structure (no shown) may include one first spacer 200c and a spacer assembly. The spacer assembly includes a plurality of second spacers 300c having the same shape. The second spacers 300c are stacked onto each other. The engaging portion 314 of each of the second spacers 300c is positioned in the positioning portion 220c. The engaging portion 314 of each of the second spacers 300c has a gasket thickness D2, and a sum of the gasket thicknesses D2 of the engaging portions 314 of the second spacers 300c is less than or equal to the recess depth D1 of the positioning portion 220c. When the second spacers 300c are fixedly stacked on the first spacer 200c, the stem 102 may be tightly abutted against the first spacer 200c and one of the second spacers 300c so as to position the first spacer 200c and the second spacers 300c. Accordingly, the adjustable spacer structure 100a of the present disclosure can only release the stem 102 and disassemble the second spacers 300c when replacing the cable inside the adjustable spacer structure 100a, and the stem 102 and the first spacer 200c are not separated from the steering tube 104 of the bicycle. The adjustable spacer structure 100c of the present disclosure may be easily assembled and disassembled and satisfy a fully integrated requirement.

Figure 9:
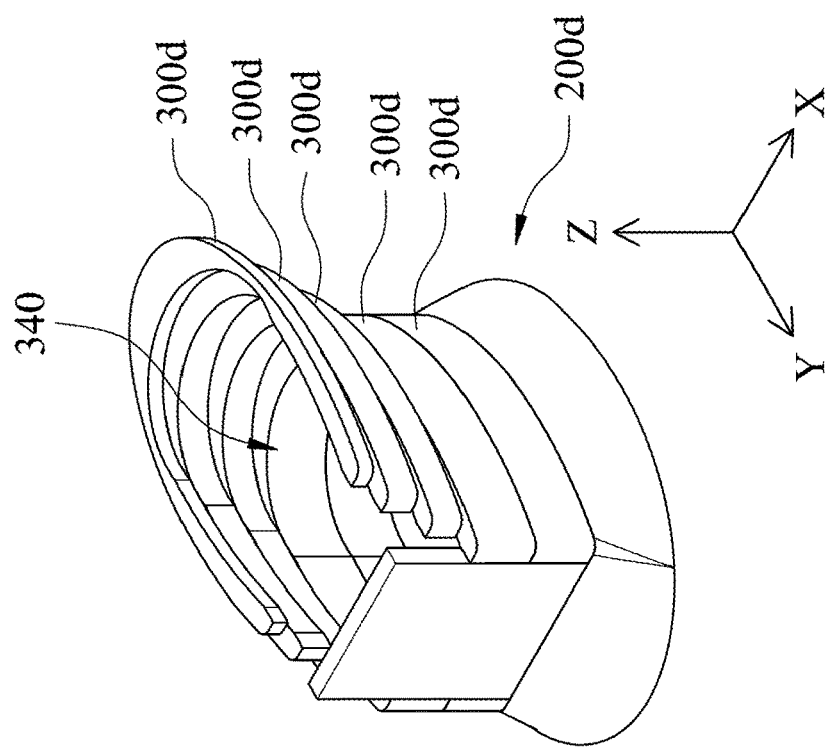
FIG. 9 shows a schematic view of an adjustable spacer structure having a stepped shape according to the third embodiment of the present disclosure.
Figure 8:
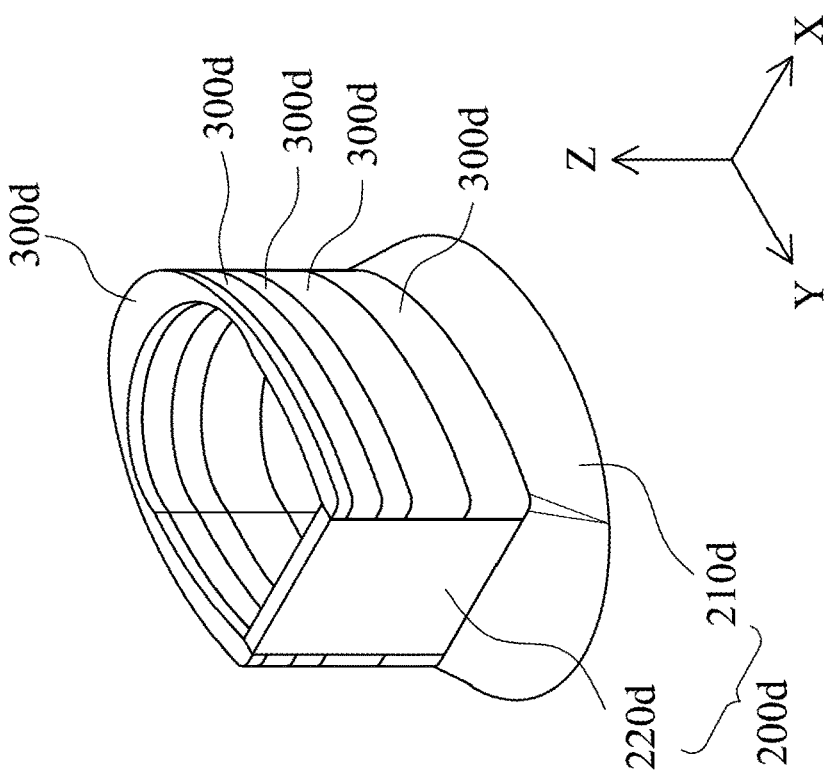
FIG. 8 shows a schematic view of an adjustable spacer structure having a stacked construction according to a third embodiment of the present disclosure.
Figure 10:
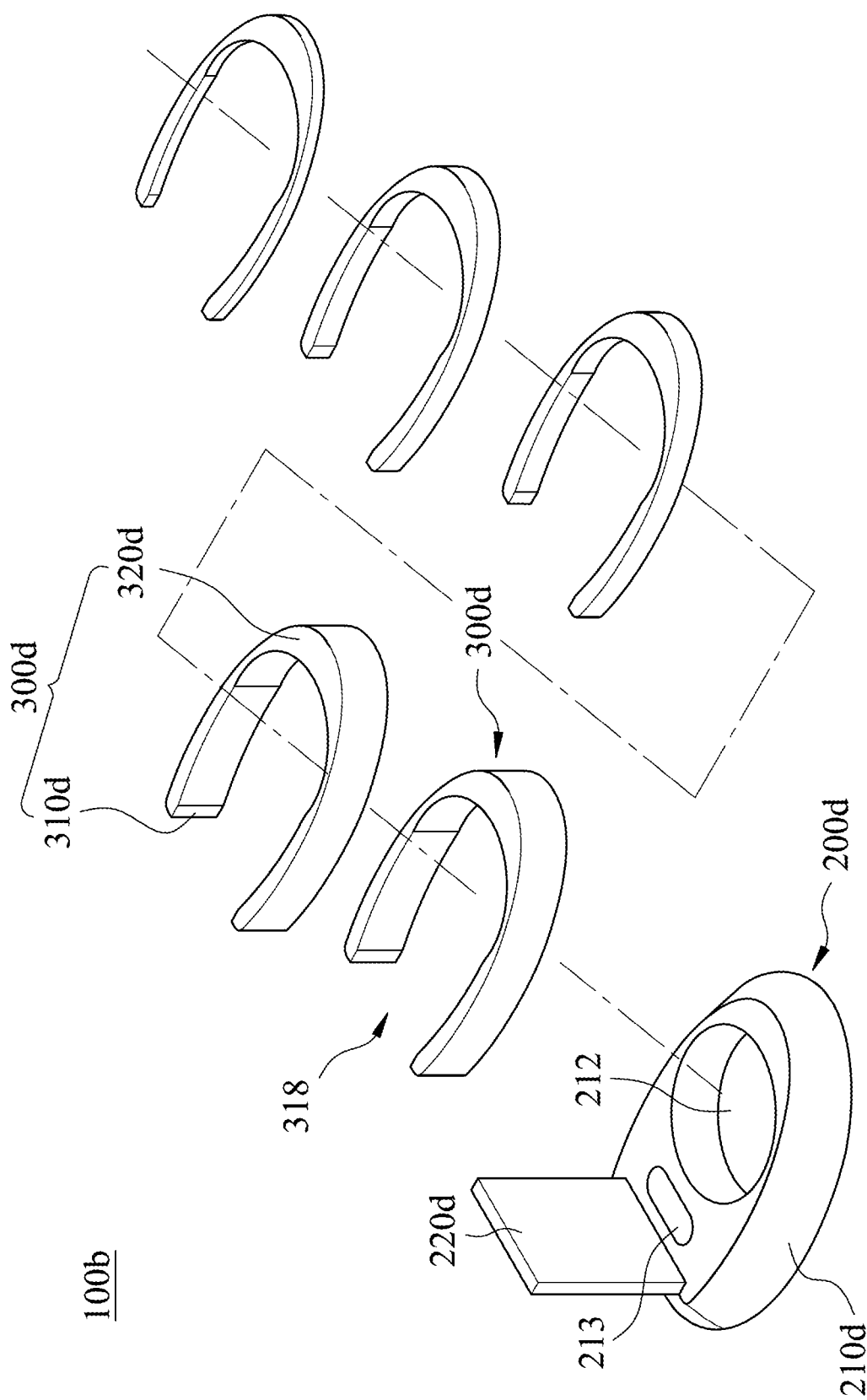
FIG. 10 shows an exploded view of the adjustable spacer structure of FIG. 9.
Figure 11:
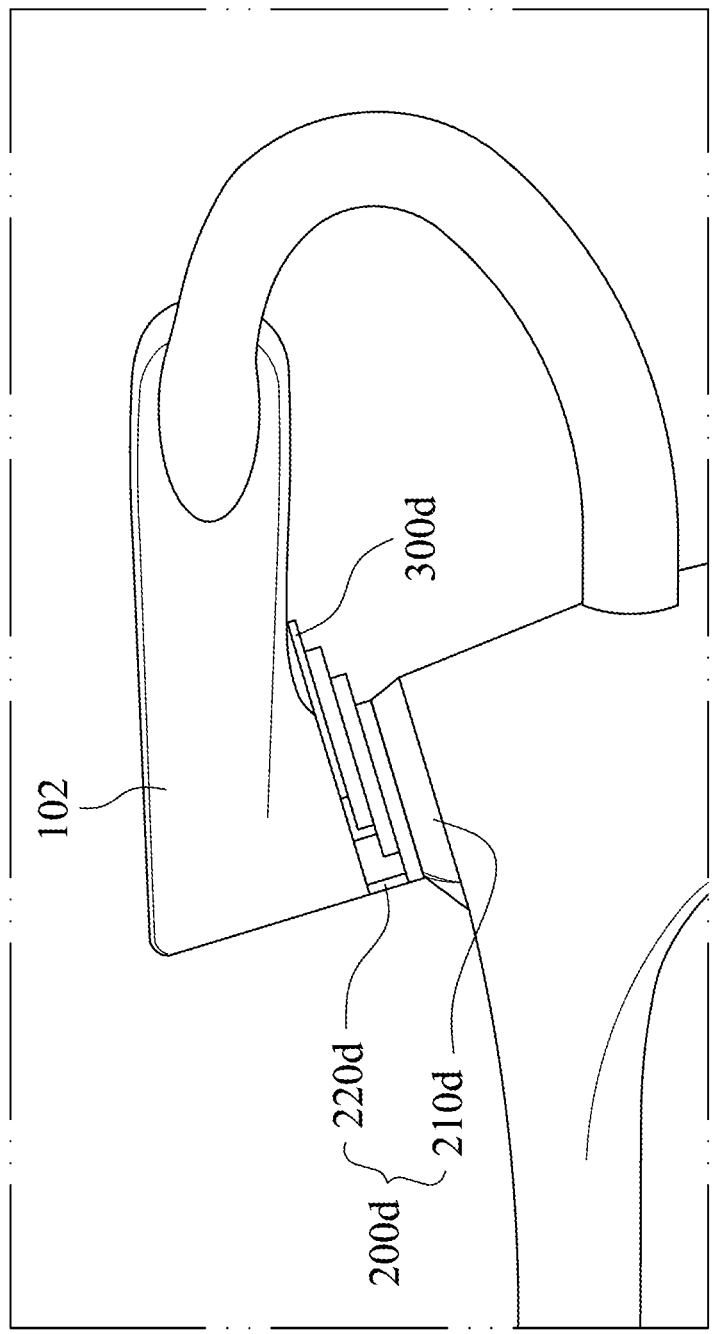
FIG. 11 shows a schematic side view of the adjustable spacer structure of FIG. 9, abutted against one stem.
Figure 12:
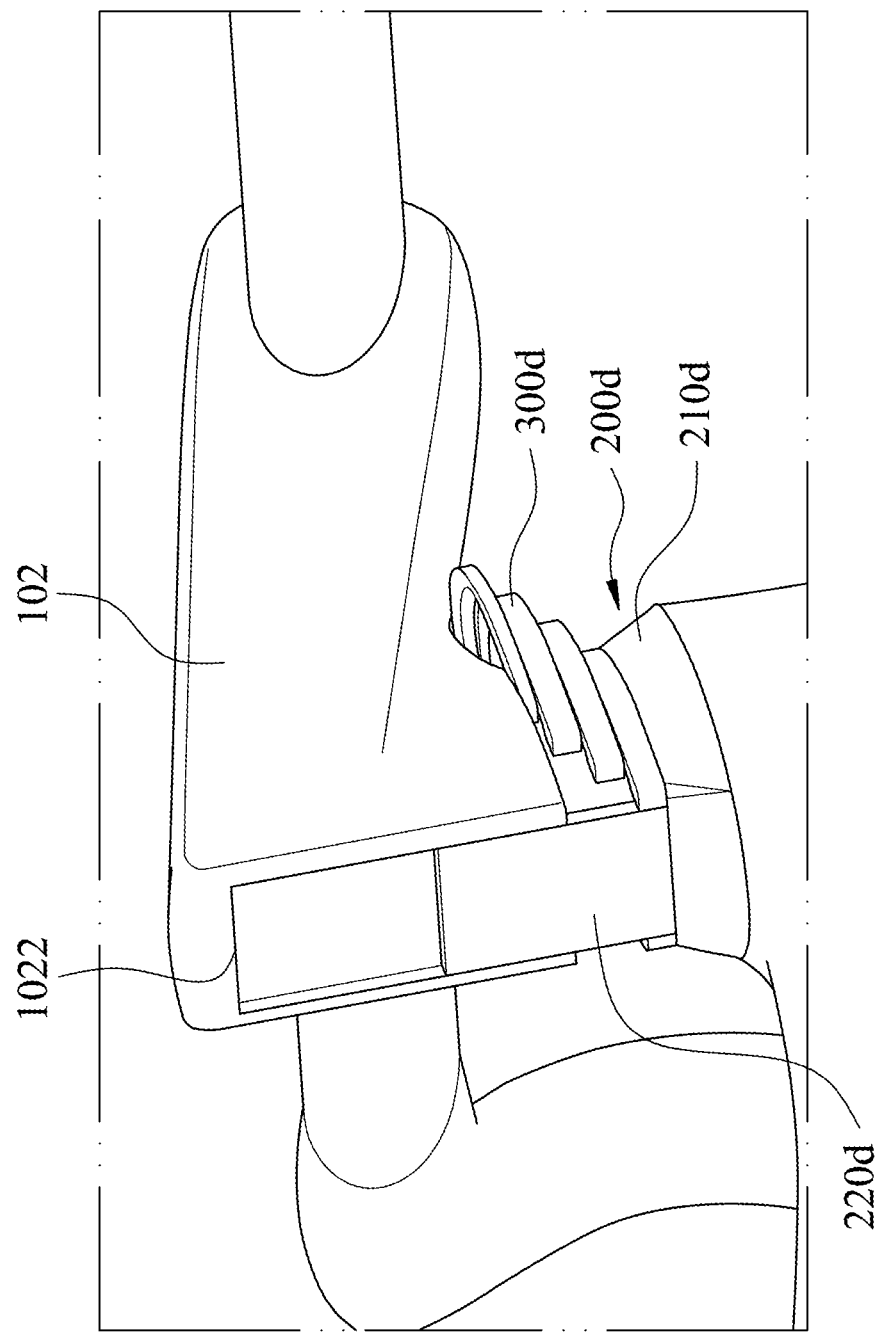
FIG. 12 shows a schematic view of the adjustable spacer structure of the bicycle of FIG. 11.

FIG. 8 shows a schematic view of an adjustable spacer structure 100b having a stacked construction according to a third embodiment of the present disclosure; FIG. 9 shows a schematic view of an adjustable spacer structure 100b having a stepped shape according to the third embodiment of the present disclosure; FIG. 10 shows an exploded view of the adjustable spacer structure 100b of FIG. 9; FIG. 11 shows a schematic side view of the adjustable spacer structure 100b of FIG. 9, abutted against one stem 102; and FIG. 12 shows a schematic view of the adjustable spacer structure 100b of the bicycle of FIG. 11. The adjustable spacer structure 100b includes a first spacer 200d and a plurality of second spacers 300d.

The first spacer 200d includes a body 210d and a positioning portion 220d. The body 210d has a closed ring shape. The body 210d includes a first opening 212 and a second opening 213. The steering tube 104 is movably disposed through the first opening 212. The second opening 213 is located between the first opening 212 and the positioning portion 220d. The second opening 213 can be passed through by a cable. The positioning portion 220d is perpendicularly disposed on the body 210d. The positioning portion 220d has a plate shape, and an extending direction of the positioning portion 220d is parallel to a Z direction. In addition, the body 210d has a lower surface contour circumference La1 and an upper surface contour circumference La2. The lower surface contour circumference La1 is greater than the upper surface contour circumference La2. In other words, the body 210d has a top surface and a bottom surface. An area of the bottom surface of the body 210d is larger than an area of the top surface of the body 210d, so that the body 210d can be stably connected to the head tube of the bicycle.

The second spacers 300d are horizontally stacked over each other to form in a stepped shape. The lowest second spacer 300d is stacked on the body 210d. Each of the second spacers 300d has a ring shape and includes a combining portion 310d and a surrounding portion 320d. The combining portion 310d has a gap 318 and is detachably connected to the positioning portion 220d via the gap 318. The steering tube 104 is configured to pass through the gap 318. There is a third opening 340 formed between the second spacer 300d and the positioning portion 220d of the first spacer 200d. The third opening 340 is correspondingly communicated with the first opening 212 and the second opening 213. Additionally, due to the second spacers 300d horizontally stacked over each other, an extending direction of each of the second spacers 300d is parallel to an X-Y plane. A thickness of each of the second spacers 300d may be different according to the requirements of the user. In FIG. 12, the stem 102 includes a positioning groove 1022 correspondingly connected to the positioning portion 220d of the first spacer 200d. When the second spacers 300d are fixedly stacked on the first spacer 200d, the stem 102 may be tightly abutted against the first spacer 200d and one of the second spacers 300d so as to position the first spacer 200d and the second spacers 300d. Hence, the adjustable spacer structure 100b of the present disclosure can be utilized to flexibly adjust the position of the stem 102 on the steering tube (not shown).

Figure 13:
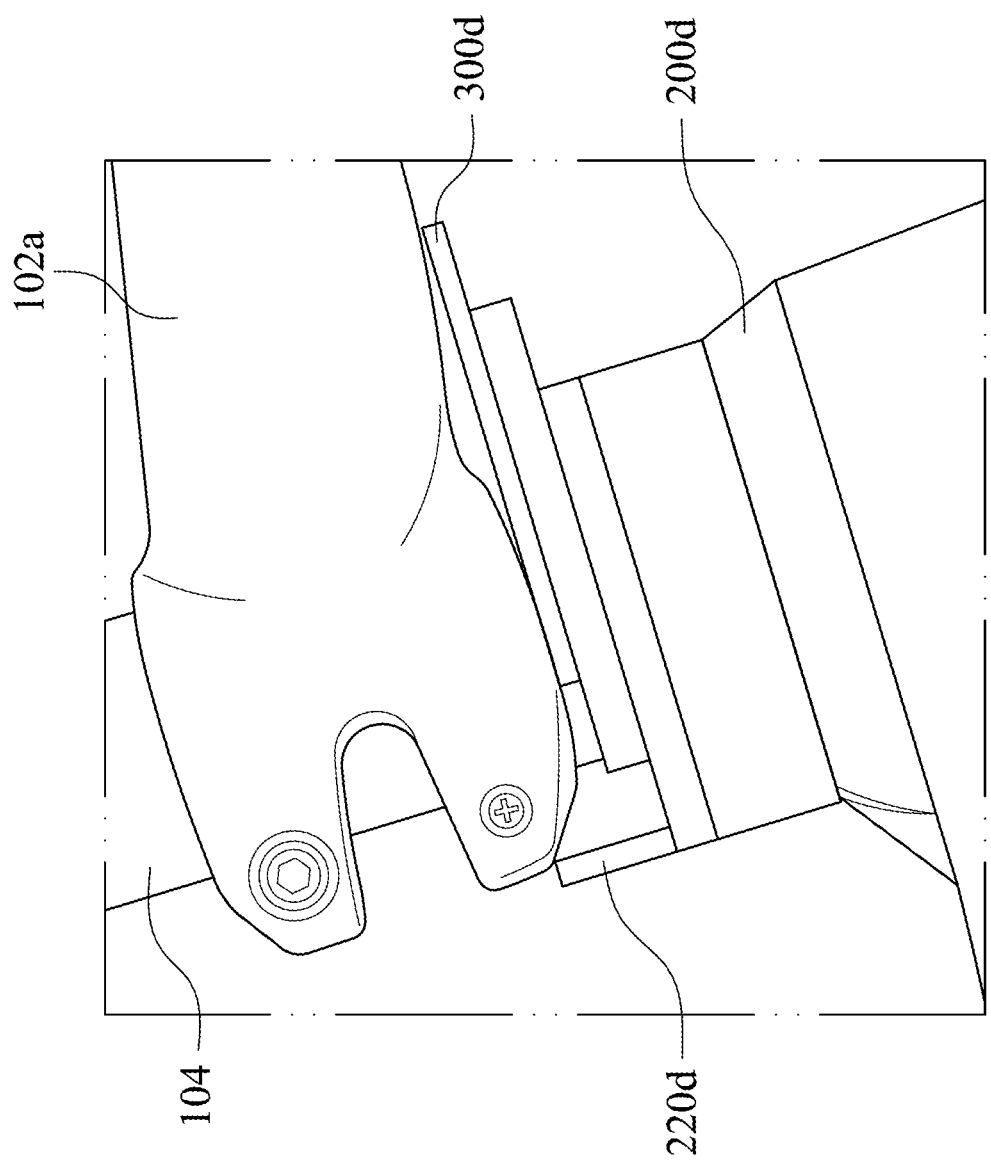
FIG. 13 shows a schematic side view of the adjustable spacer structure of FIG. 9, abutted against another stem.

FIG. 13 shows a schematic side view of the adjustable spacer structure 100b of FIG. 9, abutted against another stem 102a. Even if the bicycle has a different type of the stem 102a, the adjustable spacer structure 100b including the first spacer 200d and the second spacers 300d can be stably abutted against the stem 102a. The positioning portion 220d of the first spacer 200d is abutted against one end of the stem 102a, thus stably positioning the stem 102a.

Figure 14:
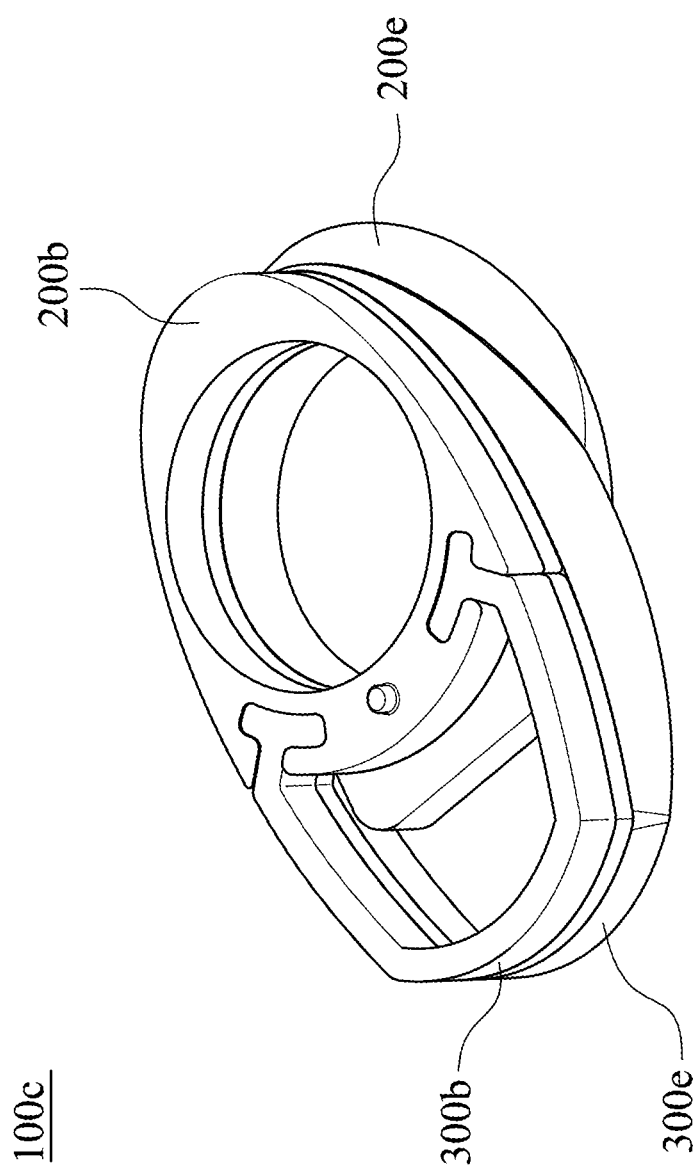
FIG. 14 shows a schematic view of an adjustable spacer structure according to a fourth embodiment of the present disclosure.
Figure 15A:
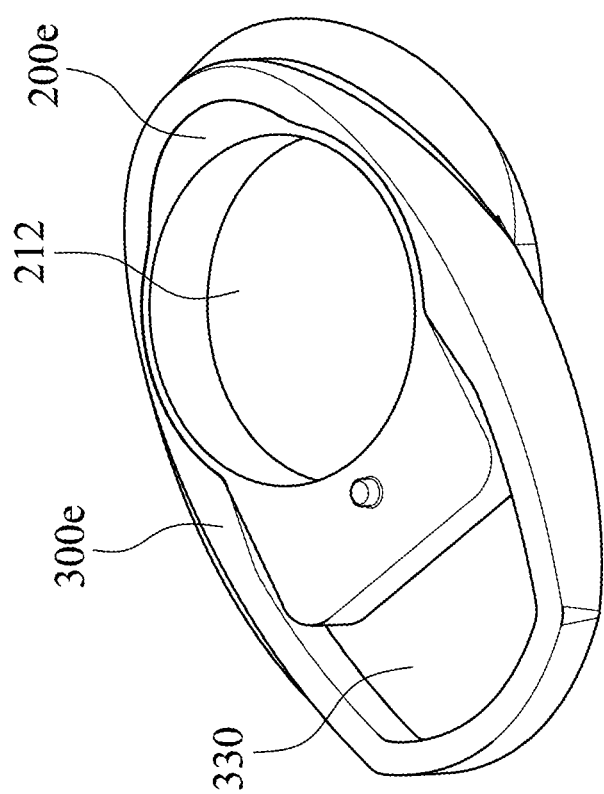
FIG. 15A shows a schematic view of a first spacer and a second spacer of the adjustable spacer structure of FIG. 14.
Figure 15B:
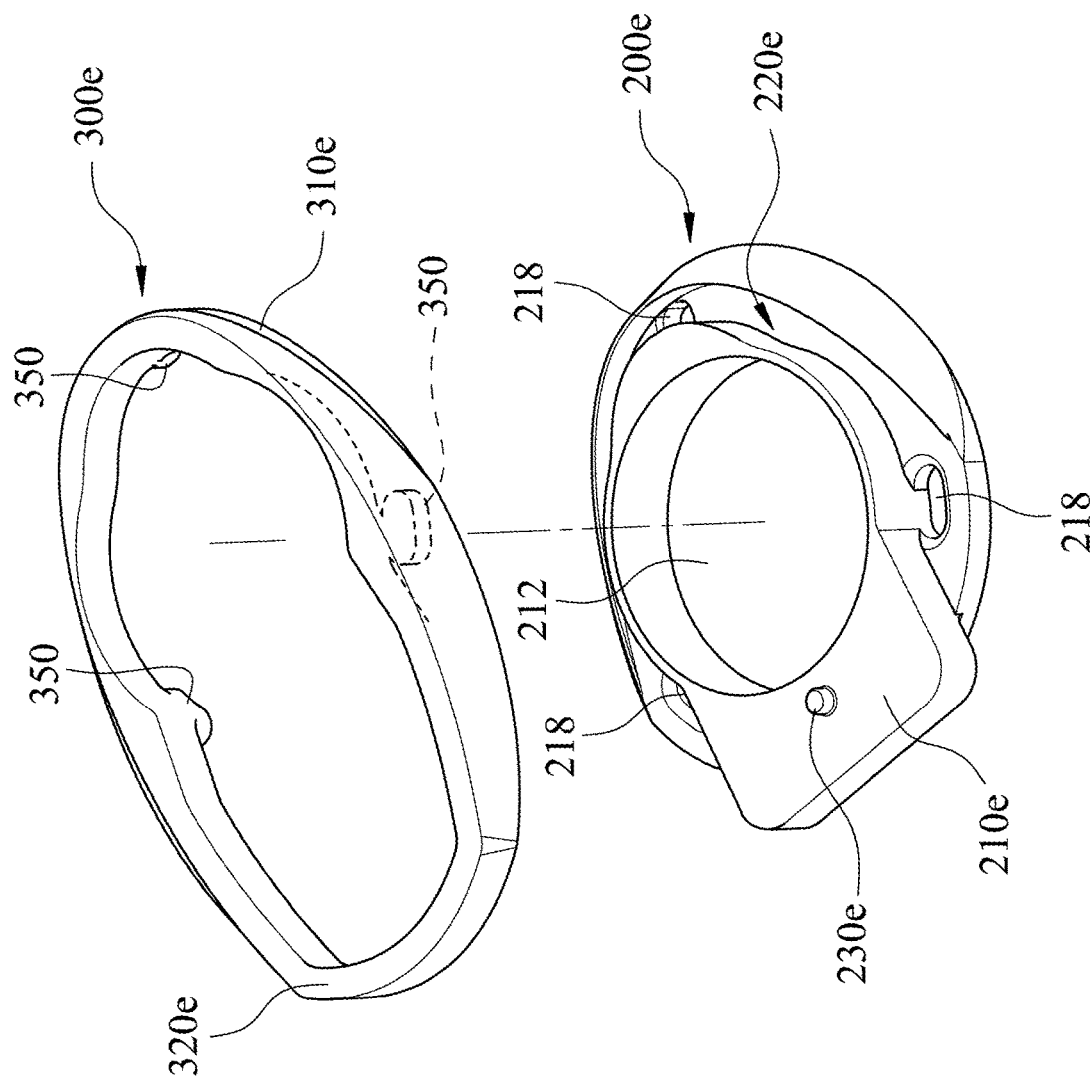
FIG. 15B shows an exploded view of the first spacer and the second spacer of the adjustable spacer structure of FIG. 14.

FIG. 14 shows a schematic view of an adjustable spacer structure 100c according to a fourth embodiment of the present disclosure; FIG. 15A shows a schematic view of a first spacer 200e and a second spacer 300e of the adjustable spacer structure 100c of FIG. 14; and FIG. 15B shows an exploded view of the first spacer 200e and the second spacer 300e of the adjustable spacer structure 100c of FIG. 14. The adjustable spacer structure 100c includes a first spacer 200b, a first spacer 200e, a second spacer 300b and a second spacer 300e.

In FIG. 14, the detail of the first spacer 200b and the second spacer 300b is the same as the embodiments of FIGS. 6A and 6B, and will not be described again herein. In FIG. 14, the adjustable spacer structure 100c further includes the first spacer 200e and the second spacer 300e. The first spacer 200e includes a body 210e, a positioning portion 220e and a latching portion 230e. The body 210e has a closed ring shape. The body 210e includes a first opening 212 and three positioning holes 218. The steering tube 104 is movably disposed through the first opening 212. The positioning portion 220e is disposed on the body 210e and has an arc shape and a groove shape. The positioning portion 220e partially surrounds the first opening 212. The three positioning holes 218 are disposed in the positioning portion 220e. The latching portion 230e is disposed on the top surface of the body 210e. The latching portion 230e can be engaged with the first spacer 200b so as to stack the first spacer 200b on the first spacer 200e.

The second spacer 300e has a ring shape. The second spacer 300e includes a combining portion 310e and a surrounding portion 320e. The combining portion 310e is detachably connected to the positioning portion 220e. A shape of the combining portion 310e is corresponding to the shape of the positioning portion 220e. The combining portion 310e includes three positioning convex portions 350 which respectively correspond to the three positioning holes 218, so that the first spacer 200e can be correspondingly engaged with the second spacer 300e. There is a second opening 330 formed between the first spacer 200e and the second spacer 300e. The combining portion 310e is integrally connected to the surrounding portion 320e. The combining portion 310e is correspondingly engaged with the positioning portion 220e. In addition, the second opening 330 is formed by an inner surface of the surrounding portion 320e and one end of the body 210e. When the second spacer 300e is fixedly stacked on the first spacer 200e, a plurality of first spacers 200b and a plurality of second spacers 300b may be sequentially stacked on the first spacer 200e and the second spacer 300e. Then, the stem 102 may be abutted against the first spacer 200b and the second spacer 300b which are located at a topmost position. Therefore, the adjustable spacer structure 100c of the present disclosure can only release the stem 102 and disassemble the second spacers 300b, 300e when replacing the cable inside the adjustable spacer structure 100c, and the stem 102 and the first spacers 200b, 200e are not separated from the steering tube 104 of the bicycle. The adjustable spacer structure 100c of the present disclosure may be easily assembled and disassembled and satisfy a fully integrated requirement. Moreover, the adjustable spacer structure 100c of the present disclosure is more stable and not easily displaced.

In one embodiment, each of the first spacers 200a, 200b, 200c, 200d, 200e of the adjustable spacer structures 100, 100a, 100b, 100c can be made of a hard material for applying a supporting force when the stem 102 is tightly abutted against the adjustable spacer structures 100, 100a, 100b, 100c. Each of the second spacers 300a, 300b, 300c, 300d, 300e can be made of a soft material for being easily assembled and disassembled. Accordingly, the adjustable spacer structures 100, 100a, 100b, 100c of the present disclosure can satisfy the fully integrated requirement by using specific materials.

According to the aforementioned embodiments and examples, the advantages of the present disclosure are described as follows.

1. The proposed adjustable spacer structure of the present disclosure may only release the stem and disassemble the second spacers when replacing the cable inside the adjustable spacer structure. The stem and the first spacers are not separated from the steering tube of the bicycle, so that the adjustable spacer structure can be easily assembled and disassembled.

2. The proposed adjustable spacer structure of the present disclosure does not need to disassemble the first spacers when replacing or disassembling the second spacers, thereby greatly shortening replacement time and improving replacement efficiency.

3. The proposed adjustable spacer structure of the present disclosure utilizes the first spacer made of a hard material for applying a supporting force when the stem is tightly abutted against the adjustable spacer structures. In addition, the second spacer can be made of a soft material for being easily assembled and disassembled. Accordingly, the adjustable spacer structure of the present disclosure can satisfy the fully integrated requirement by using specific materials.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An adjustable spacer structure of a bicycle for adjusting a height of a stem disposed on a steering tube, the adjustable spacer structure comprising:
    at least one first spacer comprising:
        a body having a ring shape and a first opening, and the steering tube movably disposed through the first opening; and
        a positioning portion disposed on the body; and
    a second spacer having a ring shape and a combining portion, wherein the combining portion is detachably connected to the positioning portion, and there is a second opening formed between the first spacer and the second spacer;
    wherein the stem is abutted against the first spacer.

2. The adjustable spacer structure of the bicycle of claim 1, further comprising:
    a plurality of first spacers, wherein one of the first spacers has a lower surface contour circumference and an upper surface contour circumference, and the lower surface contour circumference is greater than the upper surface contour circumference.

3. The adjustable spacer structure of the bicycle of claim 1, wherein the second spacer has a horseshoe shape or an arc shape, and the second spacer is tightly abutted against the stem and the first spacer.

4. The adjustable spacer structure of the bicycle of claim 1, wherein the first spacer has a lower surface contour circumference and an upper surface contour circumference, and the lower surface contour circumference is greater than the upper surface contour circumference.

5. The adjustable spacer structure of the bicycle of claim 1, wherein,
the positioning portion of the first spacer has a groove shape, the body comprises two outside surfaces and an exposed surface, and the exposed surface is connected between the two outside surfaces; and
the combining portion of the second spacer comprises:
an engaging portion correspondingly engaged with the positioning portion; and
two abutting portions connected to two ends of the engaging portion, respectively, and the two abutting portions connected to the two outside surfaces, respectively.

6. The adjustable spacer structure of the bicycle of claim 5, wherein the second spacer comprises:
a surrounding portion connected to the two abutting portions, and the second opening formed by the surrounding portion and the exposed surface.

7. The adjustable spacer structure of the bicycle of claim 6, wherein the engaging portion, the two abutting portions and the surrounding portion are integrally connected to each other.

8. The adjustable spacer structure of the bicycle of claim 1, wherein,
the positioning portion of the first spacer comprises two concave grooves, the body comprises an exposed surface, and the exposed surface is located between the two concave grooves; and
the combining portion of the second spacer comprises two convex portions, the two convex portions are detachably connected to the two concave grooves, respectively, and shapes of the two convex portions are correspondingly to shapes of the two concave grooves, respectively.

9. The adjustable spacer structure of the bicycle of claim 8, wherein the second spacer comprises:
a surrounding portion fixedly connected to the two convex portions, and the second opening formed by the surrounding portion and the exposed surface.

10. The adjustable spacer structure of the bicycle of claim 9, wherein the two convex portions and the surrounding portion are integrally connected to each other.

11. The adjustable spacer structure of the bicycle of claim 1, wherein the first spacer is made of a hard material, and the second spacer is made of a soft material.

12. An adjustable spacer structure of a bicycle for adjusting a height of a stem disposed on a steering tube, the adjustable spacer structure comprising:
at least one first spacer comprising:
a body having a ring shape and a first opening, and the steering tube movably disposed through the first opening; and
a positioning portion disposed on the body; and
a spacer assembly comprising a plurality of second spacers, wherein each of the second spacers has a ring shape and a combining portion, wherein the combining portion is detachably connected to the positioning portion, the second spacers are stacked onto each other, and there is a second opening formed between the first spacer and the second spacers;
wherein the stem is abutted against the first spacer.

13. The adjustable spacer structure of the bicycle of claim 12, wherein,
the positioning portion of the first spacer has a groove shape, the body comprises two outside surfaces and an exposed surface, and the exposed surface is connected between the two outside surfaces; and
the combining portion of each of the second spacers comprises:
an engaging portion correspondingly engaged with the positioning portion; and
two abutting portions connected to two ends of the engaging portion, respectively, and the two abutting portions connected to the two outside surfaces, respectively;
wherein the engaging portion of each of the second spacers is positioned in the positioning portion, the engaging portion of each of the second spacers has a gasket thickness, and a sum of the gasket thicknesses of the engaging portions of the second spacers is less than or equal to a recess depth of the positioning portion.

14. The adjustable spacer structure of the bicycle of claim 13, wherein each of the second spacers comprises:
a surrounding portion connected to the two abutting portions, and the second opening formed by the surrounding portion and the exposed surface.

15. The adjustable spacer structure of the bicycle of claim 12, further comprising:
a plurality of first spacers, wherein each of the first spacers further comprises a latching portion and a latching slot, the latching portion of one of the first spacers is corresponding to the latching slot of another of the first spacers which is adjacent to one of the first spacers so as to stack another of the first spacers on one of the first spacers.

16. The adjustable spacer structure of the bicycle of claim 15, wherein,
the positioning portion of each of the first spacers comprises two concave grooves, the body comprises an exposed surface, and the exposed surface is located between the two concave grooves; and
the combining portion of each of the second spacers comprises two convex portions, the two convex portions are detachably connected to the two concave grooves, respectively, and shapes of the two convex portions are corresponding to shapes of the two concave grooves, respectively.

17. The adjustable spacer structure of the bicycle of claim 16, wherein each of the second spacers comprises:
a surrounding portion fixedly connected to the two convex portions, and the second opening formed by the surrounding portion and the exposed surface.

18. The adjustable spacer structure of the bicycle of claim 12, wherein each of the second spacers has a horseshoe shape or an arc shape, and one of the second spacers is tightly abutted against the stem and the first spacer.

19. The adjustable spacer structure of the bicycle of claim 12, wherein the first spacer has a lower surface contour circumference and an upper surface contour circumference, and the lower surface contour circumference is greater than the upper surface contour circumference.

20. An adjustable spacer structure of a bicycle for adjusting a height of a stem disposed on a steering tube, the adjustable spacer structure comprising:
- a first spacer comprising:
  - a body having a ring shape, a first opening and a second opening, and the steering tube movably disposed through the first opening; and
  - a positioning portion disposed on the body; and
- at least one second spacer stacked on the body, wherein the second spacer has a ring shape and a combining portion, the combining portion has a gap and is detachably connected to the positioning portion via the gap, the steering tube is configured to pass through the gap, and there is a third opening formed between the second spacer and the positioning portion of the first spacer;
- wherein the stem is abutted against the second spacer and stacked over the first spacer.

21. The adjustable spacer structure of the bicycle of claim 20, further comprising:
- a plurality of second spacers horizontally stacked over each other to form in a stepped shape, wherein one of the second spacers is stacked on the body, and an extending direction of each of the second spacers is parallel to an X-Y plane;
- wherein the positioning portion is perpendicularly connected to the body, and an extending direction of the positioning portion is parallel to a Z direction.

22. The adjustable spacer structure of the bicycle of claim 20, further comprising:
- a plurality of second spacers horizontally stacked over each other, wherein the combining portion of each of the second spacers is connected to the positioning portion.

* * * * *